US012718029B2

(12) United States Patent
Smith

(10) Patent No.: US 12,718,029 B2
(45) Date of Patent: Aug. 25, 2026

(54) METHOD AND SYSTEM FOR FACILITATING AUTOMATED SENTIMENT ANALYSIS

(71) Applicant: JPMorgan Chase Bank, N.A., New York, NY (US)

(72) Inventor: Robert Smith, Sydney (AU)

(73) Assignee: JPMORGAN CHASE BANK, N.A., New York, NY (US)

( * ) Notice: Subject to any disclaimer, the term of this patent is extended or adjusted under 35 U.S.C. 154(b) by 402 days.

(21) Appl. No.: 18/202,469

(22) Filed: May 26, 2023

(65) Prior Publication Data

US 2024/0394482 A1 Nov. 28, 2024

(51) Int. Cl.

*G06F 40/40* (2020.01)
*G06N 5/022* (2023.01)
*G06N 5/045* (2023.01)

(52) U.S. Cl.

CPC ............. *G06F 40/40* (2020.01); *G06N 5/022* (2013.01); *G06N 5/045* (2013.01)

(58) Field of Classification Search

CPC ........ G06F 40/40; G06F 40/30; G06F 40/284; G06F 40/205; G06F 40/211; G06F 40/253; G06F 40/242; G06F 16/313; G06F 40/216; G06F 40/295; G06F 16/258; G06F 16/338; G06F 16/353; G06F 40/56; G06F 16/30; G06F 16/3329; G06F 16/242; G06F 16/3346; G06F 16/355; G06F 16/36; G06F 40/20; G06F 40/279; G06F 40/289; G06F 40/35; G06F 16/215; G06F 16/22; G06F 16/243; G06F 16/2457; G06F 16/254; G06F 16/26; G06F 16/285; G06F 16/3334; G06F 16/337; G06F 16/345; G06F 16/9024; G06F 16/93; G06F 18/2148; G06F 18/2431; G06F 40/169; G06F 40/226; G06F 40/237; G06F 40/268; G06F 40/58

See application file for complete search history.

(56) References Cited

U.S. PATENT DOCUMENTS 11,809,492 B2 * 11/2023 Sriharsha .............. G06F 16/156
12,444,402 B2 * 10/2025 Hoscilowicz ........... G06F 16/68
2017/0083817 A1 * 3/2017 Di Sciullo ............ G06F 40/205
2018/0190291 A1 * 7/2018 Lore ........................ G10L 15/22
2020/0311114 A1 * 10/2020 Sood ..................... G06F 16/345
2020/0380171 A1 * 12/2020 Bonat ................... G06F 21/604

(Continued)

*Primary Examiner* — Abdelali Serrou

(74) *Attorney, Agent, or Firm* — Greenblum & Bernstein, P.L.C.

(57) ABSTRACT

A method for providing an artificial intelligence model to facilitate automated sentiment analysis is disclosed. The method includes receiving, via a graphical user interface, a seed term, the seed term relating to a language element that represents a theme; determining, by using a model, thematic terms that relate to the seed term; aggregating, via an application programming interface, data from sources based on a predetermined parameter, the predetermined parameter including a time parameter; identifying, by using the model, thematic mentions in the aggregated data, the thematic mentions corresponding to terms from among the thematic terms; linking, by using the model, the thematic mentions with a corresponding target; and determining, by using the model, a score for each of the linked thematic mentions.

20 Claims, 5 Drawing Sheets

(56) References Cited

U.S. PATENT DOCUMENTS

| | | | | |
|---|---|---|---|---|
| 2021/0256208 | A1* | 8/2021 | Zhou | G06F 40/242 |
| 2022/0156462 | A1* | 5/2022 | Mcnamara | G06F 16/90332 |
| 2023/0074736 | A1* | 3/2023 | Matsuoka | G06Q 10/06313 |
| 2023/0076327 | A1* | 3/2023 | Matsuoka | G06F 9/4831 |
| 2023/0139628 | A1* | 5/2023 | An | G06F 40/40 705/304 |
| 2024/0249085 | A1* | 7/2024 | UzZaman | G06F 40/30 |

* cited by examiner

500

METHOD AND SYSTEM FOR FACILITATING AUTOMATED SENTIMENT ANALYSIS

BACKGROUND

1. Field of the Disclosure

This technology generally relates to methods and systems for automated data analysis, and more particularly to methods and systems for providing an artificial intelligence model to facilitate automated sentiment analysis of natural language data based on contextual linkage and thematic factors.

2. Background Information

Many business entities implement various models such as, for example, machine learning models and/or artificial intelligence models to facilitate business operations and to provide services for users. Often, these various models are tasked with automatically analyzing large quantities of data to identify trends and make predictions. Historically, implementations of conventional model generation and management techniques have resulted in varying degrees of success with respect to usable and accurate analysis of natural language data.

One drawback of using the conventional model generation and management techniques is that in many instances, exposure of various targets to sentiments may not be determined. As a result, the predictive accuracy of determining thematic exposure for a particular target such as, for example, a particular financial instrument is limited. Additionally, due to limitations with conventional models, accurate thematic predictions based on context are also limited for natural language data.

Therefore, there is a need to provide an artificial intelligence model and/or a machine learning model to facilitate automated sentiment analysis of natural language data based on contextual linkage and thematic factors.

SUMMARY

The present disclosure, through one or more of its various aspects, embodiments, and/or specific features or sub-components, provides, inter alia, various systems, servers, devices, methods, media, programs, and platforms for providing an artificial intelligence model to facilitate automated sentiment analysis of natural language data based on contextual linkage and thematic factors.

According to an aspect of the present disclosure, a method for providing an artificial intelligence model to facilitate automated sentiment analysis is disclosed. The method is implemented by at least one processor. The method may include receiving, via a graphical user interface, at least one seed term, the at least one seed term may relate to a language element that represents a theme; determining, by using at least one model, a plurality of thematic terms that relate to each of the at least one seed term; aggregating, via an application programming interface, data from a plurality of sources based on a predetermined parameter, the predetermined parameter may include a time parameter; identifying, by using the at least one model, at least one thematic mention in the aggregated data, the at least one thematic mention may correspond to at least one term from among the plurality of thematic terms; linking, by using the at least one model, each of the at least one thematic mention with a corresponding target; and determining, by using the at least one model, a score for each of the at least one linked thematic mention.

In accordance with an exemplary embodiment, the method may further include aggregating the score for each of the at least one linked thematic mention; and determining, by using the at least one model, a thematic exposure value for the target based on the aggregated score, wherein the thematic exposure value may represent a relationship between the target and a theme that is associated with the at least one thematic mention.

In accordance with an exemplary embodiment, the thematic exposure value may be determined for each of a plurality of targets based on a target listing that is received via the graphical user interface.

In accordance with an exemplary embodiment, the method may further include determining, by using the at least one model, at least one predicted outcome for the target based on the corresponding thematic exposure value; generating a graphical element that represents each of the at least one predicted outcome; and displaying the graphical element via the graphical user interface.

In accordance with an exemplary embodiment, to identify the at least one thematic mention, the method may further include identifying, by using the at least one model, at least one contextual term for each of the at least one thematic mention, the at least one contextual term may relate to a contextual frame of reference for the corresponding at least one thematic mention; and determining, by using the at least one model, a sentiment value for each of the at least one thematic mention based on the corresponding at least one contextual term, wherein the at least one contextual term may be proximately located with the corresponding at least one thematic mention in the aggregated data.

In accordance with an exemplary embodiment, prior to receiving the at least one seed term, the method may further include training the at least one model by using a training data set, the training data set may include a plurality of historical research reports; and refining the at least one model by using metadata injection, the metadata injection may relate to at least one from among sentiment injection, recency injection, and frequency injection.

In accordance with an exemplary embodiment, the aggregated data may include unstructured data in a natural language format, the unstructured data may relate to at least one from among news article content, social media content, transcript content, and analyst report content.

In accordance with an exemplary embodiment, the identified at least one thematic mention may include at least one from among a positive thematic mention and a negative thematic mention, the identified at least one thematic mention may correspond to a sentiment that is expressed for the corresponding target.

In accordance with an exemplary embodiment, the at least one model may include at least one from among a natural language processing model, a machine learning model, a mathematical model, a process model, and a data model.

According to an aspect of the present disclosure, a computing device configured to implement an execution of a method for providing an artificial intelligence model to facilitate automated sentiment analysis is disclosed. The computing device including a processor; a memory; and a communication interface coupled to each of the processor and the memory, wherein the processor may be configured to receive, via a graphical user interface, at least one seed term, the at least one seed term may relate to a language element that represents a theme; determine, by using at least one model, a plurality of thematic terms that relate to each of the at least one seed term; aggregate, via an application programming interface, data from a plurality of sources based on a predetermined parameter, the predetermined parameter may include a time parameter; identify, by using the at least one model, at least one thematic mention in the aggregated data, the at least one thematic mention may correspond to at least one term from among the plurality of thematic terms; link, by using the at least one model, each of the at least one thematic mention with a corresponding target; and determine, by using the at least one model, a score for each of the at least one linked thematic mention.

In accordance with an exemplary embodiment, the processor may be further configured to aggregate the score for each of the at least one linked thematic mention; and determine, by using the at least one model, a thematic exposure value for the target based on the aggregated score, wherein the thematic exposure value may represent a relationship between the target and a theme that is associated with the at least one thematic mention.

In accordance with an exemplary embodiment, the processor may be further configured to determine the thematic exposure value for each of a plurality of targets based on a target listing that is received via the graphical user interface.

In accordance with an exemplary embodiment, the processor may be further configured to determine, by using the at least one model, at least one predicted outcome for the target based on the corresponding thematic exposure value; generate a graphical element that represents each of the at least one predicted outcome; and display the graphical element via the graphical user interface.

In accordance with an exemplary embodiment, to identify the at least one thematic mention, the processor may be further configured to identify, by using the at least one model, at least one contextual term for each of the at least one thematic mention, the at least one contextual term may relate to a contextual frame of reference for the corresponding at least one thematic mention; and determine, by using the at least one model, a sentiment value for each of the at least one thematic mention based on the corresponding at least one contextual term, wherein the at least one contextual term may be proximately located with the corresponding at least one thematic mention in the aggregated data.

In accordance with an exemplary embodiment, prior to receiving the at least one seed term, the processor may be further configured to train the at least one model by using a training data set, the training data set may include a plurality of historical research reports; and refine the at least one model by using metadata injection, the metadata injection may relate to at least one from among sentiment injection, recency injection, and frequency injection.

In accordance with an exemplary embodiment, the aggregated data may include unstructured data in a natural language format, the unstructured data may relate to at least one from among news article content, social media content, transcript content, and analyst report content.

In accordance with an exemplary embodiment, the identified at least one thematic mention may include at least one from among a positive thematic mention and a negative thematic mention, the identified at least one thematic mention may correspond to a sentiment that is expressed for the corresponding target.

In accordance with an exemplary embodiment, the at least one model may include at least one from among a natural language processing model, a machine learning model, a mathematical model, a process model, and a data model.

According to an aspect of the present disclosure, a non-transitory computer readable storage medium storing instructions for providing an artificial intelligence model to facilitate automated sentiment analysis is disclosed. The storage medium including executable code which, when executed by a processor, may cause the processor to receive, via a graphical user interface, at least one seed term, the at least one seed term may relate to a language element that represents a theme; determine, by using at least one model, a plurality of thematic terms that relate to each of the at least one seed term; aggregate, via an application programming interface, data from a plurality of sources based on a predetermined parameter, the predetermined parameter may include a time parameter; identify, by using the at least one model, at least one thematic mention in the aggregated data, the at least one thematic mention may correspond to at least one term from among the plurality of thematic terms; link, by using the at least one model, each of the at least one thematic mention with a corresponding target; and determine, by using the at least one model, a score for each of the at least one linked thematic mention.

In accordance with an exemplary embodiment, when executed by the processor, the executable code may further cause the processor to aggregate the score for each of the at least one linked thematic mention; and determine, by using the at least one model, a thematic exposure value for the target based on the aggregated score, wherein the thematic exposure value may represent a relationship between the target and a theme that is associated with the at least one thematic mention.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
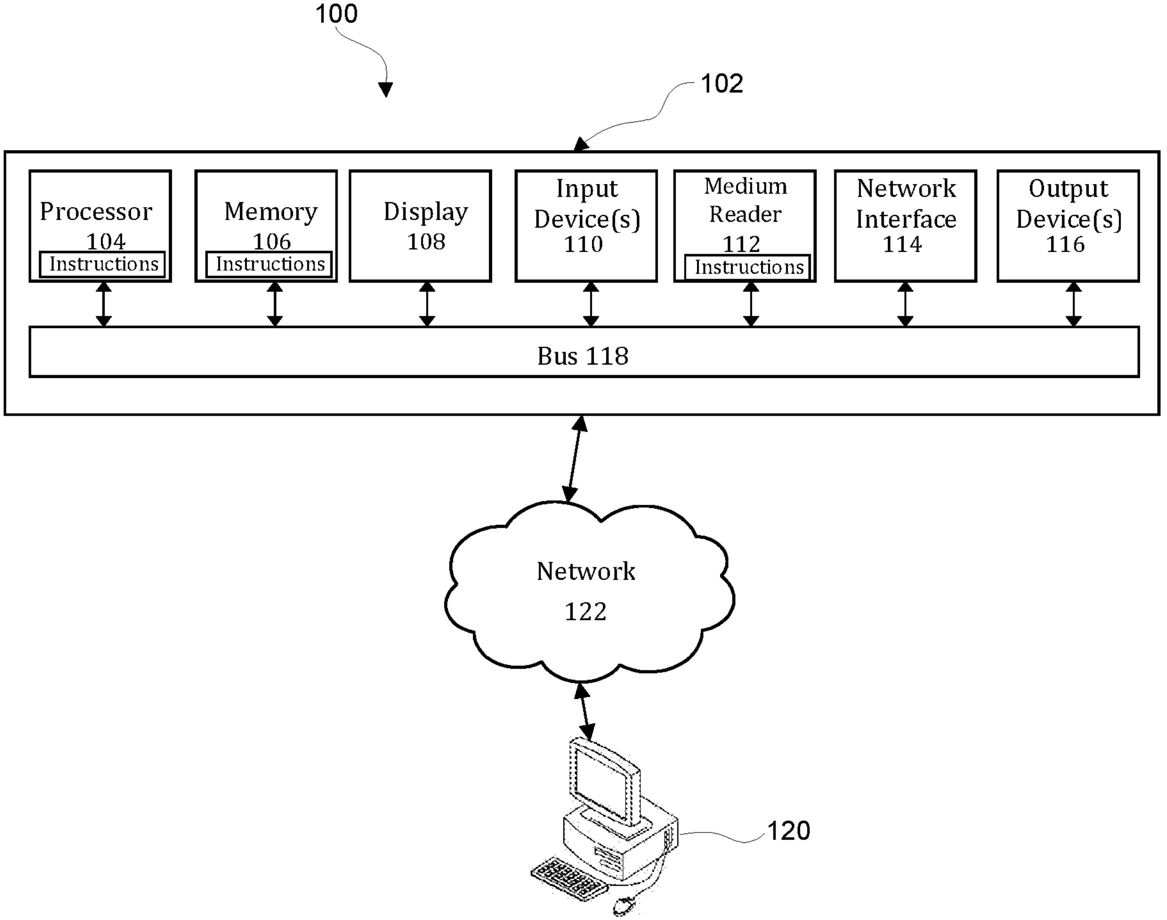
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an artificial intelligence model to facilitate automated sentiment analysis of natural language data based on contextual linkage and thematic factors.

Figure 2:
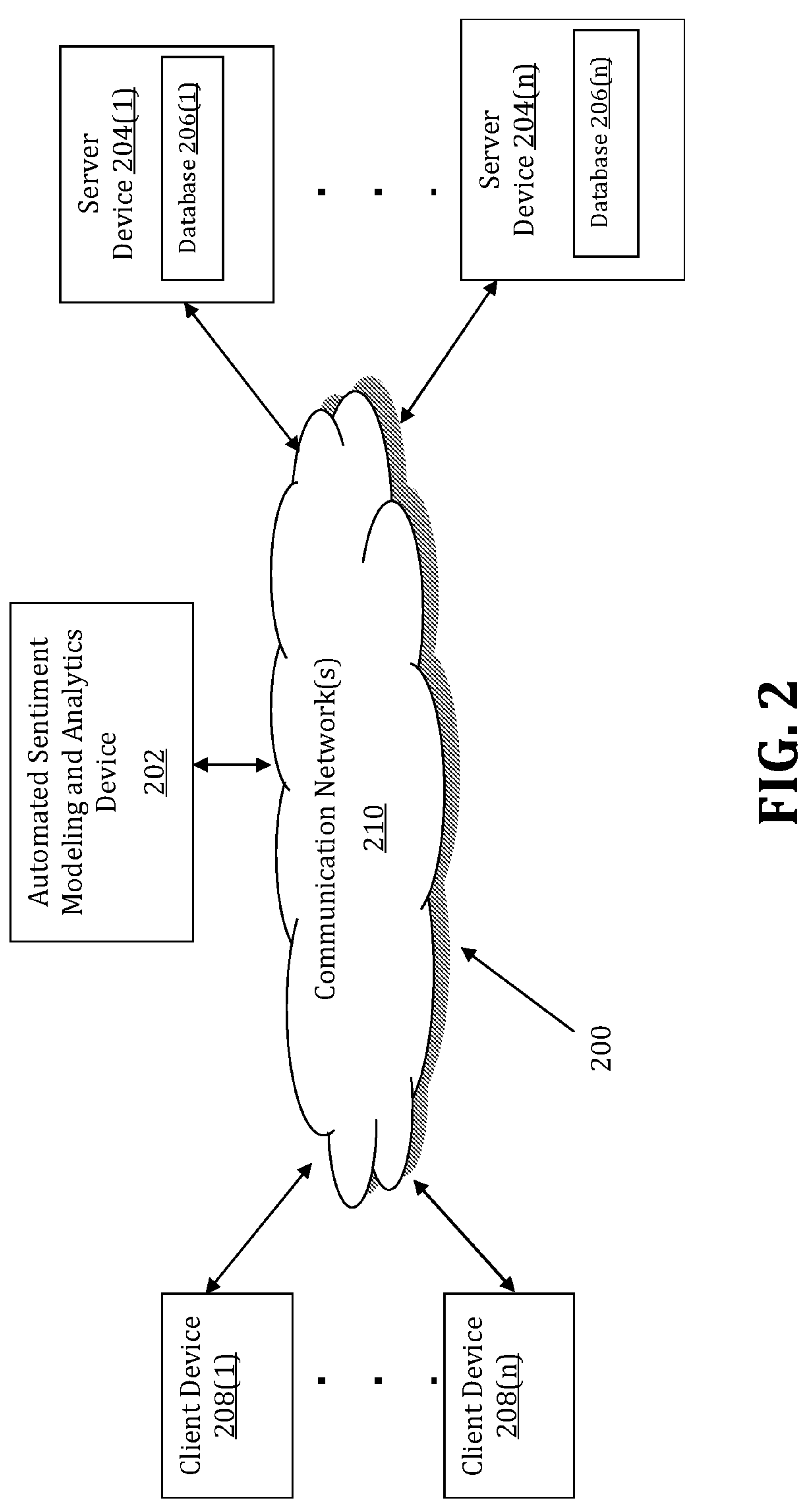
FIG. 2 illustrates an exemplary diagram of a network environment.

Referring to FIG. 2, a schematic of an exemplary network environment 200 for implementing a method for providing an artificial intelligence model to facilitate automated sentiment analysis of natural language data based on contextual linkage and thematic factors is illustrated. In an exemplary embodiment, the method is executable on any networked computer platform, such as, for example, a personal computer (PC).

The method for providing an artificial intelligence model to facilitate automated sentiment analysis of natural language data based on contextual linkage and thematic factors may be implemented by an Automated Sentiment Modeling and Analytics (ASMA) device 202. The ASMA device 202 may be the same or similar to the computer system 102 as described with respect to FIG. 1. The ASMA device 202 may store one or more applications that can include executable instructions that, when executed by the ASMA device 202, cause the ASMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASMA device 202 itself, may be located in virtual server(s) running in a cloud-based computing environment rather than being tied to one or more specific physical network computing devices. Also, the application(s) may be running in one or more virtual machines (VMs) executing on the ASMA device 202. Additionally, in one or more embodiments of this technology, virtual machine(s) running on the ASMA device 202 may be managed or supervised by a hypervisor.

In the network environment 200 of FIG. 2, the ASMA device 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the ASMA device 202, such as the network interface 114 of the computer system 102 of FIG. 1, operatively couples and communicates between the ASMA device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASMA device 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and ASMA devices that efficiently implement a method for providing an artificial intelligence model to facilitate automated sentiment analysis of natural language data based on contextual linkage and thematic factors.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASMA device 202 may be a standalone device or integrated with one or more other devices or apparatuses, such as one or more of the server devices 204(1)-204(*n*), for example. In one particular example, the ASMA device 202 may include or be hosted by one of the server devices 204(1)-204(*n*), and other arrangements are also possible. Moreover, one or more of the devices of the ASMA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the ASMA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store data that relates to artificial intelligence models, machine learning models, seed terms, language elements, themes, thematic terms, news data, social media data, transcript data, analyst report data, thematic mentions, thematic mention scores, and thematic exposure values.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the ASMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the ASMA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the ASMA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASMA device 202, the server devices 204(1)-204(*n*), or the client devices 208(1)-208(*n*), for example, may be configured to operate as virtual instances on the same physical machine. In other words, one or more of the ASMA device 202, the server devices 204(1)-204(*n*), or the client devices 208(1)-208(*n*) may operate on the same physical device rather than as separate devices communicating through communication network(s) 210. Additionally, there may be more or fewer ASMA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
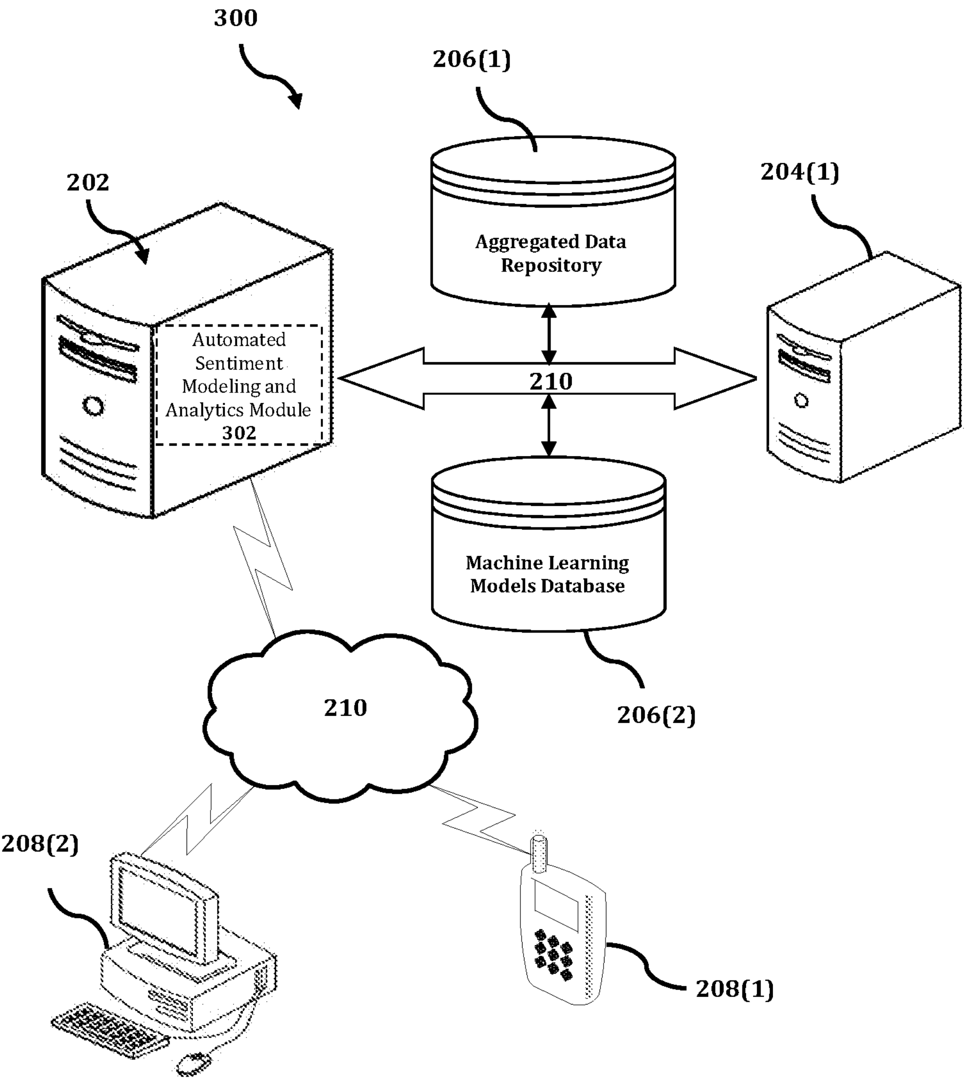
FIG. 3 shows an exemplary system for implementing a method for providing an artificial intelligence model to facilitate automated sentiment analysis of natural language data based on contextual linkage and thematic factors.

The ASMA device 202 is described and shown in FIG. 3 as including an automated sentiment modeling and analytics module 302, although it may include other rules, policies, modules, databases, or applications, for example. As will be described below, the automated sentiment modeling and analytics module 302 is configured to implement a method for providing an artificial intelligence model to facilitate automated sentiment analysis of natural language data based on contextual linkage and thematic factors.

An exemplary process 300 for implementing a mechanism for providing an artificial intelligence model to facilitate automated sentiment analysis of natural language data based on contextual linkage and thematic factors by utilizing the network environment of FIG. 2 is shown as being executed in FIG. 3. Specifically, a first client device 208(1) and a second client device 208(2) are illustrated as being in communication with ASMA device 202. In this regard, the first client device 208(1) and the second client device 208(2) may be "clients" of the ASMA device 202 and are described herein as such. Nevertheless, it is to be known and understood that the first client device 208(1) and/or the second client device 208(2) need not necessarily be "clients" of the ASMA device 202, or any entity described in association therewith herein. Any additional or alternative relationship may exist between either or both of the first client device 208(1) and the second client device 208(2) and the ASMA device 202, or no relationship may exist.

Further, ASMA device 202 is illustrated as being able to access an aggregated data repository 206(1) and a machine learning models database 206(2). The automated sentiment modeling and analytics module 302 may be configured to access these databases for implementing a method for providing an artificial intelligence model to facilitate automated sentiment analysis of natural language data based on contextual linkage and thematic factors.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASMA device 202 via broadband or cellular communication. Of course, these embodiments are merely exemplary and are not limiting or exhaustive.

Upon being started, the automated sentiment modeling and analytics module 302 executes a process for providing an artificial intelligence model to facilitate automated sentiment analysis of natural language data based on contextual linkage and thematic factors. An exemplary process for providing an artificial intelligence model to facilitate automated sentiment analysis of natural language data based on contextual linkage and thematic factors is generally indicated at flowchart 400 in FIG. 4.

Figure 4:
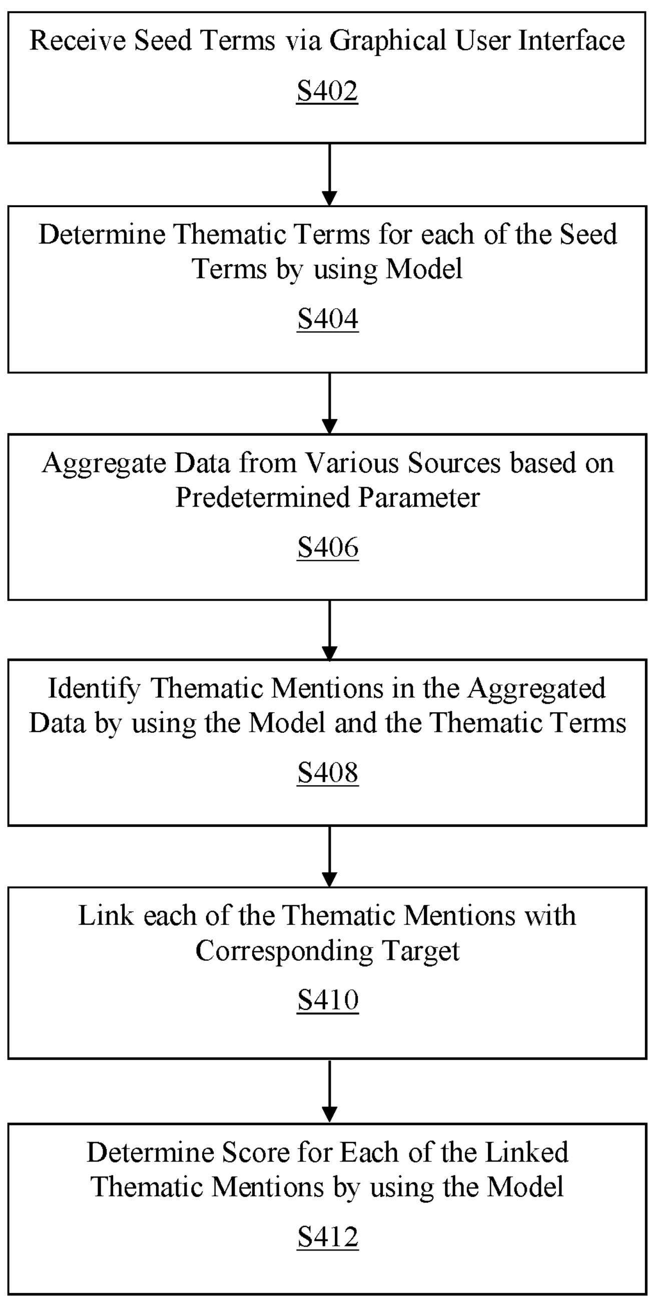
FIG. 4 is a flowchart of an exemplary process for implementing a method for providing an artificial intelligence model to facilitate automated sentiment analysis of natural language data based on contextual linkage and thematic factors.

In the process 400 of FIG. 4, at step S402, seed terms may be received via a graphical user interface. The seed terms may relate to a language element that represents a theme. In an exemplary embodiment, the language element may relate to a basic element of language such as, for example, a word that carries an objective and/or practical meaning. The language element may be usable on its own as well as in any combination with other language elements. For example, the seed terms may include a word such as dividend that relates to a sustainable dividends theme.

In another exemplary embodiment, the language element may relate to a grouping of words such as, for example, a phrase that together acts as a grammatical unit. The grouping of words may stand together as a conceptual unit and may typically form a component of a clause. For example, the seed terms may include a phrase such as rising cost pressures that relates to an inflation theme.

In another exemplary embodiment, the graphical user interface may correspond to a user interface that allows users to interact with electronic devices. The users may interact with the electronic devices though graphical icons and audio indicators. In another exemplary embodiment, the graphical user interface may include graphical elements such as, for example, windows, icons, and menus that facilitate the carrying out of commands such as, for example, the inputting of the seed terms. The users may interact with the graphical elements via input devices such as, for example, a mouse and keyboard.

In another exemplary embodiment, prior to receiving the seed terms, an identification process may be initiated to identify a theme by using statistical models from any body of text such as, for example, from news, from reports, and from journals. To identify the theme, a specific set of text may be targeted based on a predetermined time period such as, for example, a targeted month of news articles. The specific set of text may be searched for themes, which are found by examining unique clusters in the embeddings that are calculated for each headline, sentence, and paragraph of the specific set of text. When a cluster reaches a critical size, a theme that is associated with the cluster may be flagged. Consistent with present disclosures, a statistical language model such as, for example, a large language model (LLM) may be used to facilitate the thematic search.

Then, once a theme of interest that is worth exploring further is identified, the theme may be defined by using multiple unique seed terms and/or a seed sentence. The resulting definition of the theme may be referenced as the theme signature. Further, the theme signature may be used to expand the search for other thematic mentions in new texts of the same type such as, for example, new news articles, or in new texts in other text databases such as, for example, company reports.

At step S404, thematic terms that relate to each of the seed terms may be determined. The thematic terms may be determined by using a model such as, for example, an embedding model. In an exemplary embodiment, the thematic terms may correspond to language elements that have been determined to relate to the seed terms. Consistent with present disclosures, the language element may relate to a basic element of language such as, for example, a word that carries an objective and/or practical meaning. The language element may be usable on its own as well as in any combination with other language elements. Moreover, the language element may relate to a grouping of words such as, for example, a phrase that together acts as a grammatical unit. The grouping of words may stand together as a conceptual unit and may typically form a component of a clause.

In another exemplary embodiment, the thematic terms may include language elements that have been determined by the model to relate to the seed terms. The thematic terms may be identified from a thematic hierarchy that has been generated by the model. The thematic hierarchy may relate to an arrangement of language elements by the model based on similarities to the seed terms. For example, the thematic hierarchy may include a listing of thematic terms that have been ranked based on similarity to the seed terms. Consistent with present disclosures, similarity of the thematic terms to the seed terms may be quantified as a distance between the thematic terms and the seed terms.

In another exemplary embodiment, a broad listing of thematic terms from the model may be visualized by using a cluster mapping consistent with present disclosures. The cluster mapping may facilitate the exploring of the model output to identify and search for language elements and corresponding nearest neighbors. The language elements and corresponding nearest neighbors may together form related term lists. In another exemplary embodiment, K-means clustering may be usable to find unique memberships and unstructured clusters without requiring the seed terms. Consistent with present disclosures, the K-means clustering and the hierarchical clustering may be implemented as best suits the use-case.

In another exemplary embodiment, the model may include at least one from among a natural language processing model, a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S406, data from a plurality of sources may be aggregated via an application programming interface. The data may be aggregated based on a predetermined parameter. In an exemplary embodiment, the aggregated data may include unstructured data in a natural language format. The unstructured data may relate to at least one from among news article content, social media content, transcript content, and analyst report content. In another exemplary embodiment, the data may be aggregated from at least one from among first-party data sources and third-party data sources. The first-party data sources may include internally generated information such as, for example, internally generated analyst reports. The third-party data sources may include externally generated information such as, for example, news articles from a third-party news outlet and/or externally aggregated information such as, for example, social media information from a third-party data aggregator.

In another exemplary embodiment, the predetermined parameter may include a time parameter. The time parameter may be usable to govern the aggregation of the data. The time parameter may relate to a recurring arrangement that takes place at a particular time such as, for example, a predetermined schedule. For example, the predetermined parameter may dictate that the data is aggregated from the various sources weekly. Alternatively, the time parameter may relate to a historical time period to aggregate the data. For example, the time parameter may dictate that only data from the past month will be aggregated at each aggregation event.

At step S408, thematic mentions may be identified in the aggregated data. The thematic mentions may be identified by using the model. In an exemplary embodiment, the thematic mentions may correspond to at least one term from among the thematic terms. For example, aggregated data such as news articles may be parsed to identify the thematic terms. That is, the thematic terms may be usable to scan the aggregated data such that any mention of the thematic terms in the aggregated data is flagged and the context immediately surrounding the thematic terms are captured. Consistent with present disclosures, the captured context may be usable to assess whether the thematic mentions were used in the aggregated data in a good context, a neutral context, or a bad context.

In another exemplary embodiment, the identified thematic mentions may include at least one from among a positive thematic mention and a negative thematic mention. The identified thematic mentions may correspond to a sentiment that is expressed for a corresponding target such as, for example, a stock. For example, a news article may be parsed to determine whether any of the thematic terms are present. Then, by using the context of the thematic terms, whether the thematic mentions are positive or negative may be determined when at least one of the thematic terms is present. The positive thematic mention or the negative thematic mention may relate to a sentiment expressed by the news article for the corresponding target.

In another exemplary embodiment, identifying the thematic mentions may include identifying contextual terms for each of the thematic mentions. The contextual terms may be identified by using the model. The contextual terms may relate to a contextual frame of reference for the corresponding thematic mention. Then, a sentiment value for each of the thematic mentions may be determined based on the corresponding contextual terms. The sentiment value may be determined by using the model consistent with present disclosures. The contextual terms may be proximately located with the corresponding thematic mentions in the aggregated data. For example, when a theme is detected, the sentiment of the context about the theme may be determined prior to attributing the sentiment to the stock that is exposed to the theme. Consistent with present disclosures, natural language transformer models may be usable to measure the sentiment of the context surrounding the theme term mentions.

At step S410, each of the thematic mentions may be linked with a corresponding target. The thematic mentions may be linked with the corresponding target by using the model. In an exemplary embodiment, the links may relate to the context of the thematic mentions as the thematic mentions are used in the aggregated data. Each of the links may be scored based on how positive or how negative the context was. In another exemplary embodiment, the corresponding target may relate to a thing that is being discussed, described, or dealt with in the aggregated data. The corresponding target may relate to financial instruments such as, for example, stocks that are the target of discussion in the aggregated data. For example, the thematic mentions may be linked with a corresponding stock to show the sentiment for the corresponding stock in a news article.

In another exemplary embodiment, prior to the linking, the corresponding target may be identified from the aggregated data. Correctly identifying the corresponding target may be critical when calculating the exposures to themes. News articles may include many target mentions, some as focal and some only as incidental. The focal targets may be found by using a logistic regression model on a bag-of-words feature set and labeling functions. Together, the logistic regression model and the labeling functions may provide a probability value relating to whether the entity is indeed a focal target. The focal target may be tagged as such in the article. When there is more than one focal target covered, the detected theme may be allocated to the nearest focal target. A preference may be assigned for the target that is mentioned prior to the theme.

At step S412, a score for each of the linked thematic mentions may be determined. The score may be determined by using the model. In an exemplary embodiment, the score may include a Z-score. The Z-score may relate to a statistical measurement that describes a value's relationship to the mean of a group of values. The Z-score may be measured as standard deviations from the mean. For example, when a Z-score is 0, the Z-score may indicate that the data point's score is identical to the mean score. Z-scores may be positive or negative, with a positive value indicating the score is above the mean and a negative score indicating it is below the mean.

In another exemplary embodiment, a weighted sum may be calculated across all the linked thematic mentions as grouped by the corresponding target. The applied weights may correspond to any combination of the following steps: 1) relevance of the news article to the target; 2) relevance of the thematic mention to the target; 3) sentiment of the thematic mentions; 4) volume of news written about the theme; 5) discounting late mentions of themes; 6) distance of theme member term to the seed terms; 7) negate certain key words; and 8) Z-score normalized and neutralized.

In the first step, relevance of the news article to the target may be determined. That is, whether the target is the focal target or purely incidental to the article is determined. In the second step, relevance of the thematic mention to the target may be determined. That is, whether the theme was specific to the target or to another entity. In the third step, sentiment of the thematic mention may be determined. That is, was the thematic mention good or bad for the target.

In the fourth step, volume of news written about the theme for each target may be determined as a proportion of the overall news for that target. In the fifth step, late mentions of themes may be discounted so that less weight may be given for themes that are mentioned later in a single article. In the sixth step, the distance of theme member term to the seed terms may be determined. The distance may be measured from the centroid to discount less relevant or noisy terms. In the seventh step, certain keywords that are known to create noise may be negated. In the eighth step, the Z-score may be normalized and neutralized by country and/or sector as needed.

In another exemplary embodiment, a thematic exposure value may be determined for the target. The thematic exposure value may represent a relationship between the target and a theme that is associated with each of the thematic mentions. To facilitate the determining, the score for each of the linked thematic mentions may be aggregated. Then, the thematic exposure value for the target may be determined based on the aggregated score. The thematic exposure value may be determined by using the model consistent with present disclosures.

In another exemplary embodiment, the thematic exposure value may be determined for each of a plurality of targets based on a target listing that is received via the graphical user interface. The target listing may include a list of targets where corresponding thematic exposure values are desired. For example, a listing of multiple targets may be provided via the graphical user interface so that the thematic exposure value may be determined for each of the multiple targets.

In another exemplary embodiment, the thematic exposure value may be determined based on a summation of all scores that correspond to the linked thematic mentions for the target. For example, the summation of all linked sentiments for the target may be usable to represent the exposure the target has to an associated theme. In another exemplary embodiment, the thematic exposure value may be determined based on an average of all scores that correspond to the linked thematic mentions for the target. The average may relate to a value that expresses a typical score in the set of all scores for the target. For example, the average of all linked sentiments for the target may be usable to represent the exposure the target has to the associated theme.

In another exemplary embodiment, consistent with present disclosures, a relative exposure to a theme may be calculated for each of the targets in the news. To facilitate the calculation, theme mentions for the targets may be penalized and normalized by the total word counts and the total article counts. For example, larger-cap targets may have more words written about them, so the larger-cap targets may need to be neutralized to ensure equitable exposure determinations when compared with smaller-cap targets.

In another exemplary embodiment, predicted outcomes for the target may be determined based on the corresponding thematic exposure value. The predicted outcomes may be determined by using the model. For example, when mentions related to a theme such as sustainable dividends are identified in aggregated news articles, calculated exposures for corresponding stocks may be correlated to forecasted yield levels and forecasted yield growth. In another example, the calculated exposures may be usable to determined macro trends, security baskets, and cross-sectional factors.

Then, a graphical element such as, for example, a dashboard that visually represents each of the predicted outcomes may be generated. The dashboard may relate to a reporting mechanism that aggregates and displays metrics and key indicators for examination at a glance by users. The graphical element may be displayed via the graphical user interface. In another exemplary embodiment, the graphical element may be configured to accept inputs from a user to facilitate user interactions. For example, the user may interact with graphical representations of buttons and/or menu items to organize and filter displayed information.

In another exemplary embodiment, prior to receiving the seed terms, the model may be trained by using a training data set. The training data set may include a plurality of historical research reports such as, for example, analyst reports. Then, the model may be refined by using metadata injection. The metadata injection may relate to at least one from among sentiment injection, recency injection, and frequency injection.

Figure 5:
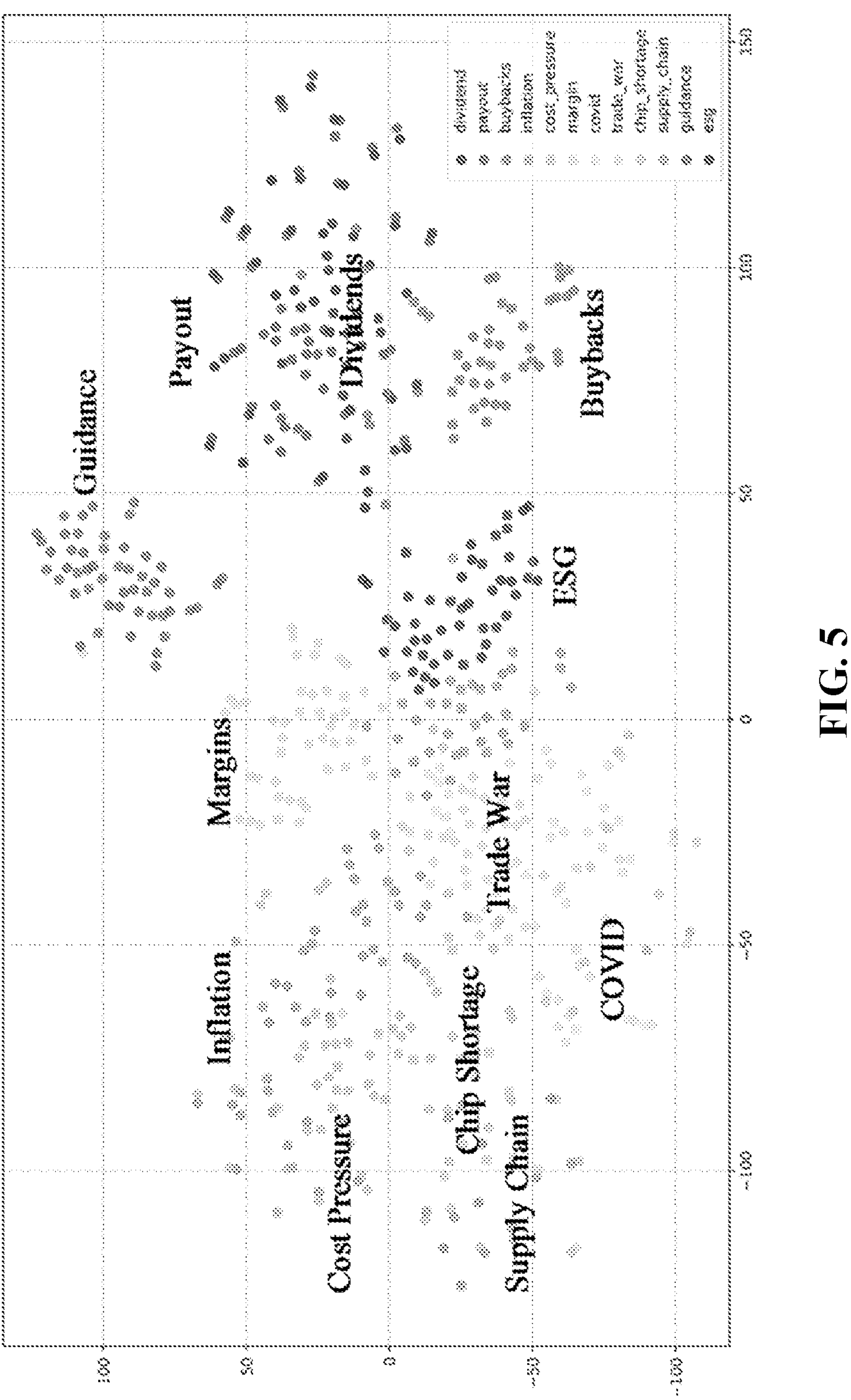
FIG. 5 is a cluster map of an exemplary thematic determining process for implementing a method for providing an artificial intelligence model to facilitate automated sentiment analysis of natural language data based on contextual linkage and thematic factors.

FIG. 5 is a cluster map 500 of an exemplary thematic determining process for implementing a method for providing an artificial intelligence model to facilitate automated sentiment analysis of natural language data based on contextual linkage and thematic factors. In FIG. 5, a two-dimensional cluster map for exemplary themes is provided. The cluster map may graphically represent how selected thematic phrases are embedded relative to each other.

Consistent with present disclosures, FIG. 5 graphically represents a machine learnt embedding model that is usable to create automated theme hierarchies. The terms in these hierarchies may be usable to scan news articles, transcripts, and analyst reports. Context around each of the terms may be identified and sentiment/relevance for corresponding stocks may be aggregated to calculate the stocks' exposure to top-level themes.

In an exemplary embodiment, the disclosed model may be trained on a historical collection of analyst reports to build a knowledge base of various terms and phrases. The model may intuitively group together similar terms such as, for example, dividend, buybacks, and repurchase according to usage in a particular field of analysis such as, for example, a finance field. In post processing, metadata may be injected along new dimensions to correct for sentiment confusion and to facilitate handling of themes that evolve with new terms over time. The disclosed model may produce a hierarchy of theme terms that are built around a seed term. To stay current as well as capture new and emerging themes, the disclosed model may continuously learn as additional data is added to the training data set.

In another exemplary embodiment, after the initial training, the embedding model may be improved by using metadata injection. Initially, sentiment injection may be usable to give the model better differentiation between words like "strong" and "weak". Then, recency and frequency injection may help identify more recent and popular terms. The knowledge base of the model may include various terms and phrases as well as the relative position and distance of each of the terms and phrases from one another. Thus, a scan of the embedding model may be usable to identify neighboring terms of a seed term, which may enable the generation of a theme cluster and/or a theme hierarchy.

In another exemplary embodiment, an automated pruning mechanism may be provided to discount terms that are further away from the seed term. The automated pruning mechanism may utilize a cosine similarity determination to discount the terms. Discounting the terms that are further away from the seed term may help with outlier data and/or noise data.

In another exemplary embodiment, phrase annotations may be usable in the corpus to better capture topics using additional bigrams, trigrams, and even quad-grams. Initially, it is noted that stop-words may be used in natural language processing to reduce the word count of the bag of words for training and parsing. The stop-words may not have any worth in sentiment extraction, so the stop-words are usually excluded to save processing time. However, in the presently disclosed invention, the stop-words may be usable as delimiters to create tokens on the text to use as phrases. Thus, searches may be conducted through the entire corpus to look for the entire phrase token, and no longer just for the words. High phrase counts may be kept for further processing.

Consistent with present disclosures, the entire corpus may then be annotated with the newly formed phrases. As such, the spaces between the words making up the phrases may be underscored everywhere the phrases are found in the corpus. A phrase may be marked for annotation only when the phrase occurs more than a predetermined threshold. Once annotated, the phrases, i.e., the words joined by underscore, are treated simply as new words and embedded into the phrase model just like with the word embedding model. Then, just as before with the word embedding, the same process may be repeated but instead on the words and phrases found in the newly annotated corpus.

In another exemplary embodiment, problem clusters may be polarized by injecting another dimension that is derived from metadata such as, for example, external training data. The problem clusters may correspond to words that are positioned near each other in the embedding model but have opposite meanings, which may result in sentiment confusion. Positive labels may push this new dimension in one direction, while negative labels may push this new dimension in the opposite direction.

To resolve the problem clusters, one or more dimensions may be used to polarize sentiment. The newly injected dimension may shift words in each cluster that have opposite meanings in opposite directions. This may be accomplished by calculating the positivity score for each word and phrase, which is in essence the occurrence of the phrase or word in positively labelled training data vs. the occurrence in negatively labelled data. In formulaic terms, the calculation may be expressed as:

$$\text{Positivity } i = \frac{\text{Count in } Pos \text{ Label} - \text{Count in } Neg \text{ Label}}{\text{Total Count}} \times \text{Amplification Factor}$$

The newly injected dimension may be appended to the original embedding model. With the extra dimension that is the positivity score metadata, cosine similarity scores around words may be retested before and after the sentiment injection. Phrases that are expected to be better related may be more aligned than before and now there are no longer any incorrect and/or conflicting sentiment words near problem words such as, for example, strong and weak. Sentiment injection in this case may improve the embedding model.

In another exemplary embodiment, metadata injection for recency and frequency may also be used consistent with present disclosures. A new dimension that is an exponential moving average of the count of the phrases in time may be injected into the embedding model. Mentions of each theme term may be correlated with mentions of the seed term through time. Together, these actions may enable the nearest neighbor cluster to better collate terms from similar time periods. This may be helpful when the theme terms are evolving over time.

Accordingly, with this technology, an optimized process for providing an artificial intelligence model to facilitate automated sentiment analysis of natural language data based on contextual linkage and thematic factors is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an artificial intelligence model to facilitate automated sentiment analysis, the method being implemented by at least one processor, the method comprising:

utilizing a target time period to train at least one embedding model with a training data set, wherein the at least one embedding model comprises a Markov model that models randomly changing systems;

refining the at least one embedding model by injecting, into the at least one embedding model, at least one new dimension that comprises an exponential moving average of a count of phrases in the target time;

receiving, by the at least one processor via a graphical user interface, at least one seed term that relates to a language element that represents a theme;

utilizing, by the at least one processor using the at least one embedding model, a thematic hierarchy to identify a plurality of thematic terms that relate to each of the at least one seed term wherein the thematic hierarchy has been generated by the at least one embedding model;

aggregating, by the at least one processor via an application programming interface, data from a plurality of sources based on a time parameter;

identifying, by the at least one processor using the at least one embedding model, at least one thematic mention in the aggregated data, the at least one thematic mention corresponding to at least one term from among the plurality of thematic terms;

linking, by the at least one processor using the at least one embedding model, each of the at least one thematic mention with a corresponding target;

determining, by the at least one processor using the at least one embedding model, a score for each of the at least one linked thematic mention, wherein the score is based on a weighted sum calculated across each from among the at least one linked thematic mention as grouped with the corresponding target; and utilizing the score to collate the plurality of thematic terms from the target time period to facilitate automated sentiment analysis of natural language data.

2. The method of claim 1, further comprising:

aggregating, by the at least one processor, the score for each of the at least one linked thematic mention; and determining, by the at least one processor using the at least one embedding model, a thematic exposure value for the target based on the aggregated score, wherein the thematic exposure value represents a relationship between the target and a theme that is associated with the at least one thematic mention.

3. The method of claim 2, wherein the thematic exposure value is determined for each of a plurality of targets based on a target listing that is received via the graphical user interface.

4. The method of claim 2, further comprising:

determining, by the at least one processor using the at least one embedding model, at least one predicted outcome for the target based on the corresponding thematic exposure value;

generating, by the at least one processor, a graphical element that represents each of the at least one predicted outcome; and displaying, by the at least one processor, the graphical element via the graphical user interface.

5. The method of claim 1, wherein identifying the at least one thematic mention further comprises:

identifying, by the at least one processor using the at least one embedding model, at least one contextual term for each of the at least one thematic mention, the at least one contextual term relating to a contextual frame of reference for the corresponding at least one thematic mention; and determining, by the at least one processor using the at least one embedding model, a sentiment value for each of the at least one thematic mention based on the corresponding at least one contextual term, wherein the at least one contextual term is proximately located with the corresponding at least one thematic mention in the aggregated data.

6. The method of claim 1, wherein the aggregated data includes unstructured data in a natural language format, the unstructured data relating to at least one from among news article content, social media content, transcript content, and analyst report content.

7. The method of claim 1, wherein the identified at least one thematic mention includes at least one from among a positive thematic mention and a negative thematic mention, the identified at least one thematic mention corresponding to a sentiment that is expressed for the corresponding target.

8. The method of claim 1, wherein the at least one embedding model includes at least one from among a natural language processing model, a machine learning model, a mathematical model, a process model, and a data model.

9. The method of claim 1, wherein the training data set includes a cluster of historical research reports that correspond to the target time period, and wherein while training the at least one embedding model, when the cluster of historical research reports reaches a critical size, the theme is determined to be associated with the cluster of historical research reports and the theme is flagged.

10. The method of claim 1, wherein the weighted sum comprises applied weights that correspond to relevance, sentiment, volume of pertinent information, and distance of the theme from the at least one seed term.

11. A computing device configured to implement an execution of a method for providing an artificial intelligence model to facilitate automated sentiment analysis, the computing device comprising:

a processor;

a memory; and a communication interface coupled to each of the processor and the memory, wherein the processor is configured to:

utilize a target time period to train at least one embedding model with a training data set, wherein the at least one embedding model comprises a Markov model that models randomly changing systems;

refine the at least one embedding model by injecting, into the at least one embedding model, at least one new dimension that comprises an exponential moving average of a count of phrases in the target time;

receive, via a graphical user interface, at least one seed term that relates to a language element that represents a theme;

utilizing, by using the at least one embedding model, a thematic hierarchy to identify a plurality of thematic terms that relate to each of the at least one seed term, wherein the thematic hierarchy has been generated by the at least one embedding model;

aggregate, via an application programming interface, data from a plurality of sources based on a time parameter;

identify, by using the at least one embedding model, at least one thematic mention in the aggregated data, the at least one thematic mention corresponding to at least one term from among the plurality of thematic terms;

link, by using the at least one embedding model, each of the at least one thematic mention with a corresponding target;

determine, by using the at least one embedding model, a score for each of the at least one linked thematic mention, wherein the score is based on a weighted sum calculated across each from among the at least one linked thematic mention as grouped with the corresponding target; and utilizing the score to collate the plurality of thematic terms from the target time period to facilitate automated sentiment analysis of natural language data.

12. The computing device of claim 11, wherein the processor is further configured to:

aggregate the score for each of the at least one linked thematic mention; and determine, by using the at least one embedding model, a thematic exposure value for the target based on the aggregated score, wherein the thematic exposure value represents a relationship between the target and a theme that is associated with the at least one thematic mention.

13. The computing device of claim 12, wherein the processor is further configured to determine the thematic exposure value for each of a plurality of targets based on a target listing that is received via the graphical user interface.

14. The computing device of claim 12, wherein the processor is further configured to:

determine, by using the at least one embedding model, at least one predicted outcome for the target based on the corresponding thematic exposure value;

generate a graphical element that represents each of the at least one predicted outcome; and display the graphical element via the graphical user interface.

15. The computing device of claim 11, wherein, to identify the at least one thematic mention, the processor is further configured to:

identify, by using the at least one embedding model, at least one contextual term for each of the at least one thematic mention, the at least one contextual term relating to a contextual frame of reference for the corresponding at least one thematic mention; and determine, by using the at least one embedding model, a sentiment value for each of the at least one thematic mention based on the corresponding at least one contextual term, wherein the at least one contextual term is proximately located with the corresponding at least one thematic mention in the aggregated data.

16. The computing device of claim 11, wherein the aggregated data includes unstructured data in a natural language format, the unstructured data relating to at least one from among news article content, social media content, transcript content, and analyst report content.

17. The computing device of claim 11, wherein the identified at least one thematic mention includes at least one from among a positive thematic mention and a negative thematic mention, the identified at least one thematic mention corresponding to a sentiment that is expressed for the corresponding target.

18. The computing device of claim 11, wherein the at least one embedding model includes at least one from among a natural language processing model, a machine learning model, a mathematical model, a process model, and a data model.

19. A non-transitory computer readable storage medium storing instructions for providing an artificial intelligence model to facilitate automated sentiment analysis, the storage medium comprising executable code which, when executed by a processor, causes the processor to:

utilize a target time period to train at least one embedding model with a training data set, wherein the at least one embedding model comprises a Markov model that models randomly changing systems;

refine the at least one embedding model by injecting, into the at least one embedding model, at least one new dimension that comprises an exponential moving average of a count of phrases in the target time;

receive, via a graphical user interface, at least one seed term that relates to a language element that represents a theme;

utilize, by using the at least one embedding model, a thematic hierarchy to identify a plurality of thematic terms that relate to each of the at least one seed term, wherein the thematic hierarchy has been generated by the at least one embedding model;

aggregate, via an application programming interface, data from a plurality of sources based on a time parameter;

identify, by using the at least one embedding model, at least one thematic mention in the aggregated data, the at least one thematic mention corresponding to at least one term from among the plurality of thematic terms;

link, by using the at least one embedding model, each of the at least one thematic mention with a corresponding target;

determine, by using the at least one embedding model, a score for each of the at least one linked thematic mention, wherein the score is based on a weighted sum calculated across each from among the at least one linked thematic mention as grouped with the corresponding target; and utilizing the score to collate the plurality of thematic terms from the target time period to facilitate automated sentiment analysis of natural language data.

20. The storage medium of claim 19, wherein, when executed by the processor, the executable code further causes the processor to:

aggregate the score for each of the at least one linked thematic mention; and determine, by using the at least one embedding model, a thematic exposure value for the target based on the aggregated score, wherein the thematic exposure value represents a relationship between the target and a theme that is associated with the at least one thematic mention.

* * * * *